United States Patent
Zhang et al.

(10) Patent No.: US 7,446,435 B2
(45) Date of Patent: Nov. 4, 2008

(54) POWER CONVERTER SYSTEM AND METHOD

(75) Inventors: Richard S. Zhang, Rexford, NY (US); Changyong Wang, Shanghai (CN); Lei Li, Shanghai (CN); James Patrick Lyons, Niskayuna, NY (US); Zhuohui Tan, Shanghai (CN); Allen Michael Ritter, Roanoke, VA (US)

(73) Assignee: General Electric Company, Niskayuna, NY (US)

( * ) Notice: Subject to any disclaimer, the term of this patent is extended or adjusted under 35 U.S.C. 154(b) by 188 days.

(21) Appl. No.: 11/289,919

(22) Filed: Nov. 30, 2005

(65) Prior Publication Data
US 2007/0121353 A1    May 31, 2007

(51) Int. Cl.
*H02M 1/12* (2006.01)
(52) U.S. Cl. .................................. 307/105; 363/41
(58) Field of Classification Search .................. 363/17, 363/34, 35, 37, 50–53, 55, 56.01, 56.02, 363/56.06, 56.07, 39–48, 65–72, 98, 132, 363/41; 307/105
See application file for complete search history.

(56) References Cited

U.S. PATENT DOCUMENTS

| | | | | |
|---|---|---|---|---|
| 4,783,728 | A * | 11/1988 | Hoffman | 363/37 |
| 5,132,888 | A | 7/1992 | Lo et al. | |
| 6,680,856 | B2 * | 1/2004 | Schreiber | 363/71 |
| 6,751,106 | B2 * | 6/2004 | Zhang et al. | 363/71 |
| 7,042,109 | B2 * | 5/2006 | Gabrys | 290/44 |
| 2004/0017689 | A1 | 1/2004 | Zhang et al. | |
| 2004/0196677 | A1 | 10/2004 | Zhang et al. | |
| 2007/0073445 | A1 | 3/2007 | Gonzalez et al. | |

FOREIGN PATENT DOCUMENTS

EP        0837548 B1    6/2003

* cited by examiner

*Primary Examiner*—Shawn Riley
(74) *Attorney, Agent, or Firm*—Ann M. Agosti

(57) ABSTRACT

A power system for providing an output power to a load is provided. The system comprises a generator configured to generate an alternating current input power and an power converter system coupled to the generator and configured to generate an output power and provide the output power to the load through at least one transformer. The system further comprises a converter control system coupled to the converter system and configured to drive the converter system in an interleaved pattern to reduce harmonic components in the output power and the alternating current input power.

33 Claims, 10 Drawing Sheets

POWER CONVERTER SYSTEM AND METHOD

BACKGROUND

The invention relates generally to power converter systems and more specifically to a method and system for operating a power converter system in an interleaved manner.

Many devices, such as wind turbines, include power converter systems. A power converter system is typically used to convert an input voltage, which may be fixed frequency alternating current, variable frequency alternating current, or direct current, to a desired output frequency and voltage level. A converter system usually includes several power semiconductor switches such as insulated gate bipolar transistors (IGBTs), integrated gate commutated thrusters (IGCTs or GCTs), or MOSFETs that are switched at certain frequencies to generate the desired converter output voltage and frequency. The converter output voltage is then provided to various loads. Loads as used herein are intended to broadly include motors, power grids, and resistive loads, for example.

Typically, power converter systems use multiple power converter bridges in parallel with synchronous gating control to expand power handling capability. In wind turbine applications, a power converter bridge usually refers to a three-phase converter circuit with six power switches. In order to meet both grid side and machine side power quality requirements, such systems generally use very large and costly filters to smooth out pulse width modulated waveforms (hereinafter referenced as "PWM filters"). Such systems sometimes cause overheating of the generator due to high harmonic components.

One way to alleviate the requirement for a large PWM filter is to increase the switching frequency of the converter system. However, switching frequency increases result in a reduced efficiency of the system. Generator overheating may be reduced by removing the amortizes winding, but removal of the winding results in reduced stability during transient conditions and increased voltage stress on field voltage during load changes.

Therefore, what is desired is a low cost power converter system that is capable of operating with high availability while maintaining a high quality output power.

BRIEF DESCRIPTION

Briefly, according to one embodiment of the invention, an power system for providing an output power to a load is provided. The power system comprises a generator configured to generate an alternating current input power and a power converter system coupled to the generator and configured to generate an output power. The output power is provided to the load through at least one transformer. The power system further comprises a converter control system coupled to the converter system and configured to drive the converter system in an interleaved fashion to reduce harmonic components in the output power or the alternating current input power. As used herein, "or" in this embodiment means in the input power, in the output power, or both in the input power and the output power.

In another embodiment, a method for providing an output power to a load comprises converting an alternating current input power to generate an output power using a converter system. The output power is provided to the load. The method further includes driving the converter system in an interleaved pattern to reduce harmonic components in the output power or the alternating current input power.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
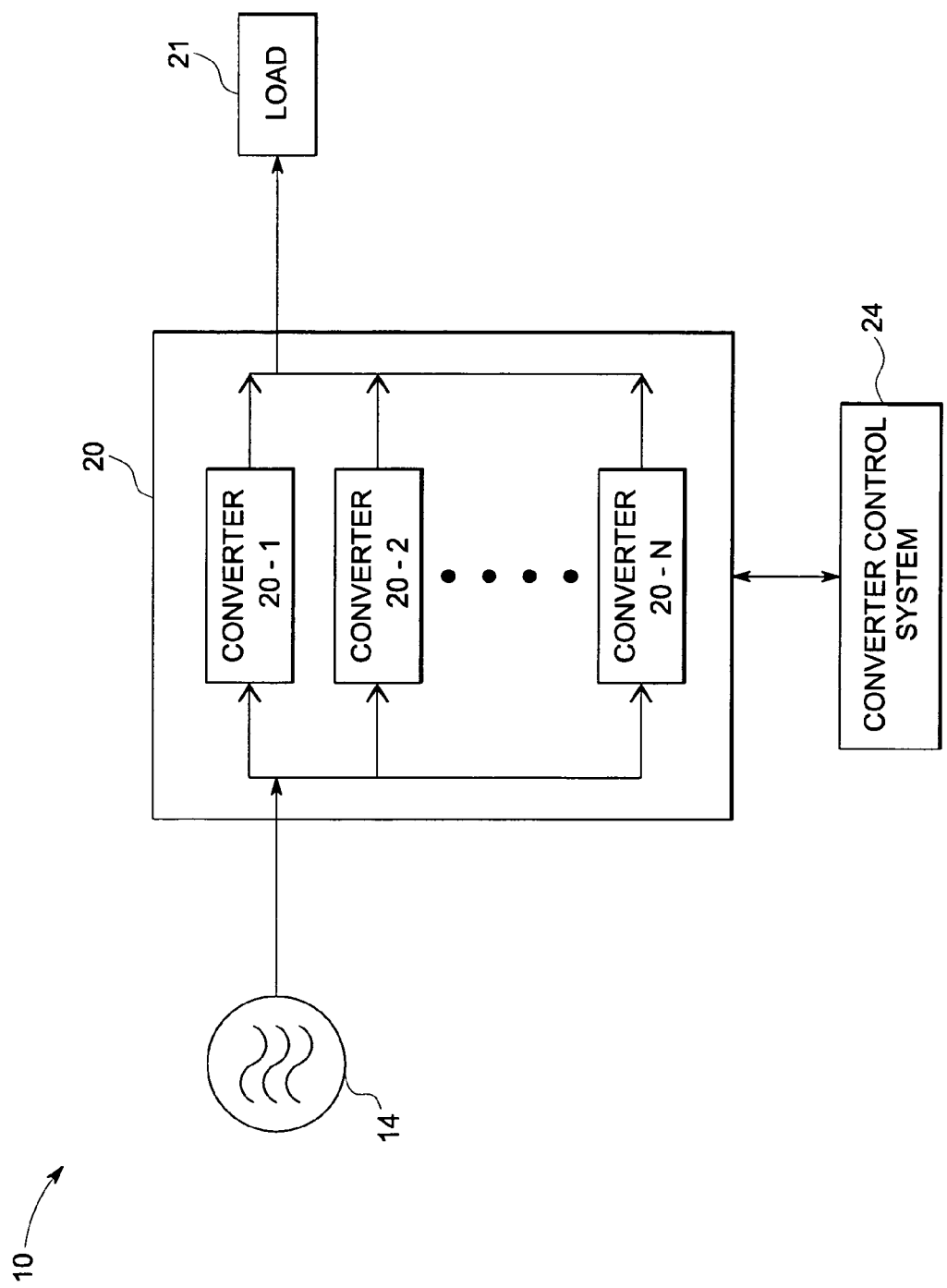
FIG. 1 is a block diagram of a power converter system implemented according to one aspect of the invention.

FIG. 1 is a block diagram of one embodiment of a power system 10 implemented according to one aspect of the invention. Power system 10 is configured for supplying power to a load 21. Each block is described in further detail below.

A generator source 14 is configured to generate an AC input power. The AC input power is provided to power converter system 20. The power converter system 20 comprises converter 20-1 through 20-N. The converters are coupled in parallel and configured to receive the AC input power from the generator source 14. The power converter system 20 is configured to convert the AC input power to an output power. The output power is provided to load 21. In one embodiment, the output power has a fixed frequency. Loads may include motors, power grids, and resistive loads, for example. Although grids are traditionally suppliers of power, in some wind turbine system embodiments, wind turbine power is supplied to a utility grid which acts as a load in such embodiments.

Converter control system 24 is configured to provide control signals for the operation of the converter system 20. The converter control system is coupled to the converter system and is configured to drive the converter system in an interleaved pattern. The operation of the converter system in the interleaved manner controls each converter thread with phase displaced gating signals and reduces overall switching harmonic components due to cancellation of phase shifted switching waveforms. The manner in which the power converter system 20 operates in an interleaved manner is described in further detail below.

Figure 2:
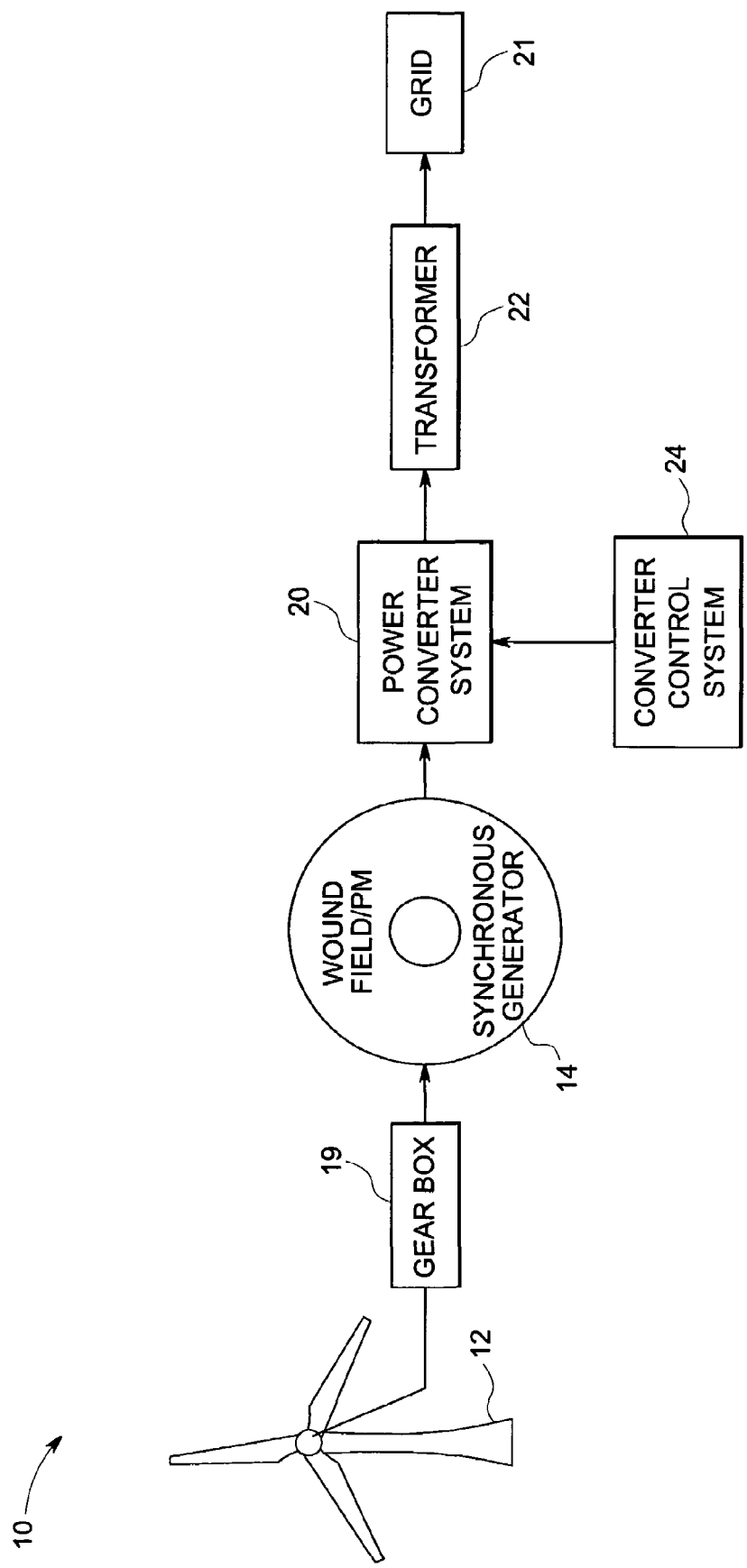
FIG. 2 is a block diagram of an power converter system coupled to a wound field or permanent magnet (PM) synchronous generator and implemented according to one aspect of the invention.

FIG. 2 is a block diagram of one embodiment of an power converter coupled to a wind turbine with synchronous wound-field or permanent magnet generator and implemented according to one aspect of the invention. The power converter system is configured to provide output power to grid 21. Each block is explained in further detail below.

A wind turbine 12 is configured for converting wind energy to mechanical energy. The wind turbine is coupled through a gear box 19 to generator 14 or alternatively coupled directly to generator 14. Wind energy is captured by the rotation of the wind turbine's blades, and generator 14 is configured for generating a variable frequency input power.

Power converter system 20 is configured for converting the variable frequency input power received from generator 14 to a fixed frequency output power. The power converter system includes generator side converters and load side converters. In one embodiment, the power converter system is a three-phase converter system. Other systems may alternatively be used, with one non-limiting example being a single phase system. Several exemplary power converter system embodiments are described in further detail with reference to FIGS. 6-9. Continuing with FIG. 2, the output of the power converter system is provided to a load 21 via a transformer unit 22, for example.

Figure 3:
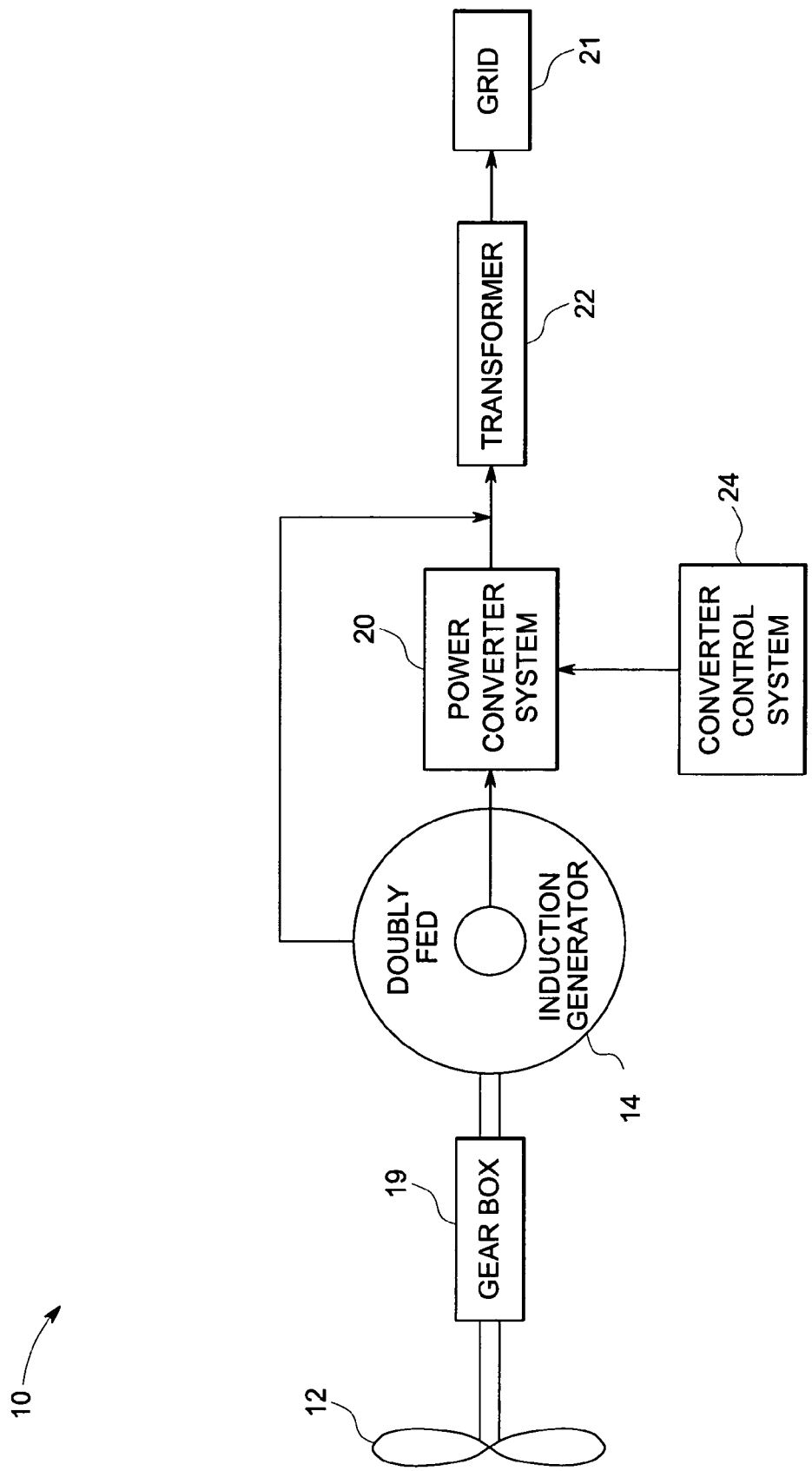
FIG. 3 is a block diagram of a doubly fed induction generator with an power converter system coupled to a wind turbine and implemented according to one aspect of the invention.

FIG. 3 is a block diagram of a doubly fed induction generator with power converter system implemented according to one aspect of the invention. In the doubly fed wind turbine system, the output of the stator winding of the generator 14 is combined with the fixed frequency output power of power converter system 20 coupled to the output of the rotor winding of the generator 14. The combined output power is provided to grid 21 via transformer 22.

Figure 4:
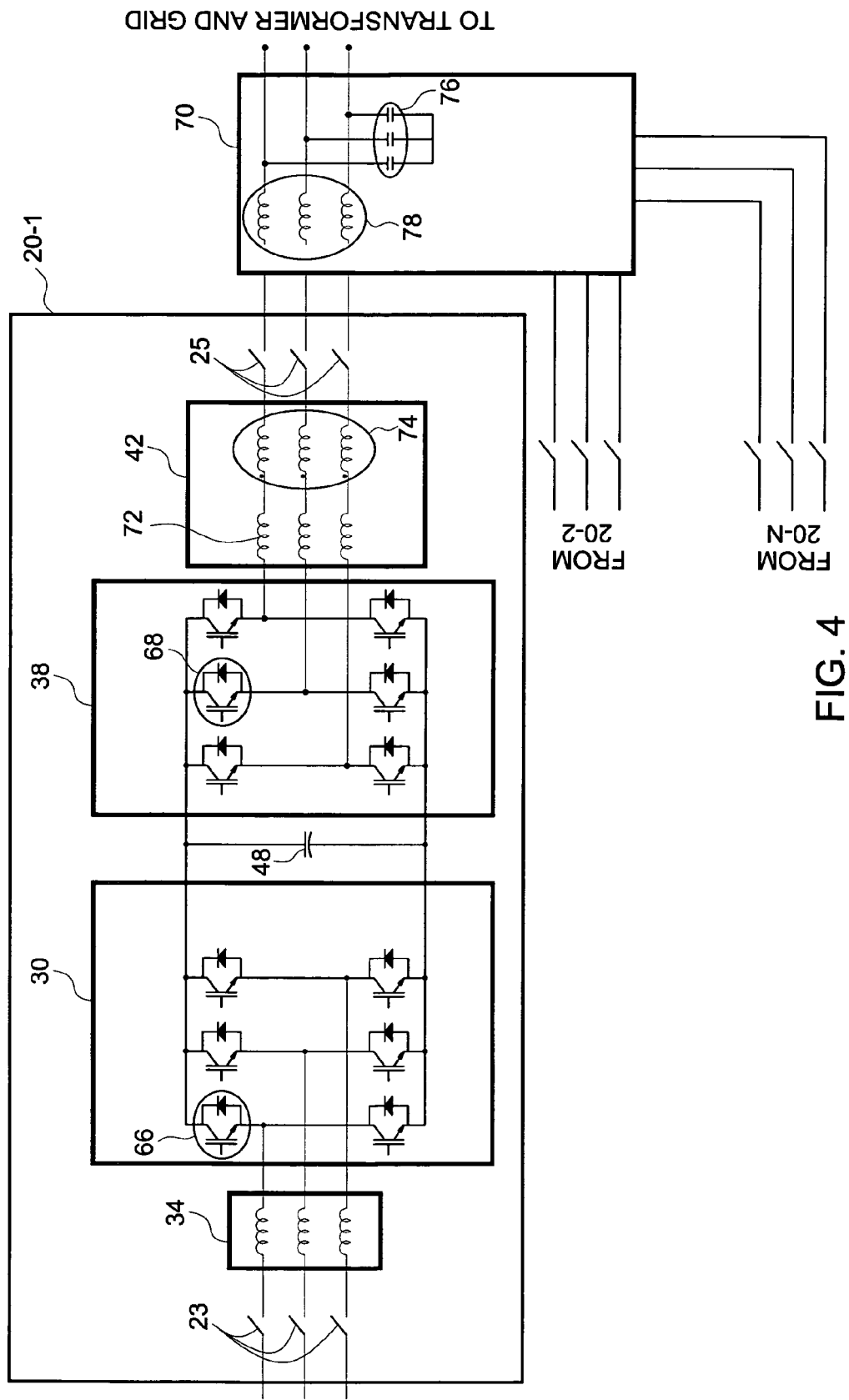
FIG. 4 is a block diagram of one thread of a power converter system implemented in accordance with one aspect of the invention.

FIG. 4 is a block diagram of one thread of a power converter system implemented according to one aspect of the invention. Wind turbine embodiments, for example, typically comprise three phase power converter systems. Converter 20-1 represents one thread of power converter system 20. Converter 20-1 comprises generator converter bridge 30 and load converter bridge 38. Generator converter bridge 30 is implemented using six power switches 66. Similarly, load side bridge 38 is implemented using six power switches 68. The waveform combiner 42 of each thread is coupled to the overall PWM filter 70 for the converter system. The waveform combiner 42 comprises differential mode chokes 72 which are sufficiently large to enable interleaved gating. This is in contrast to any smaller size differential mode chokes which are needed to minimize unbalanced current sharing with conventional non-interleaved converter systems. PWM filter 70 comprises inductive components 78 and capacitive components 76.

The differential mode chokes 72 in the waveform combiners provide some or all of the function of the total inductance in PWM filter 70 and suppress the high frequency (switching frequency range) differential mode cross current which results from the interleaved gating control. When used, the common mode choke 74 in the waveform combiner suppresses the high frequency (switching frequency range) common mode cross current that links both generator side converters and the load side converters. The filtered output from the PWM filter 70 is provided to the load. For simplicity, filter 70 is not shown in the earlier embodiments, but such filters are typically present.

Figure 5:
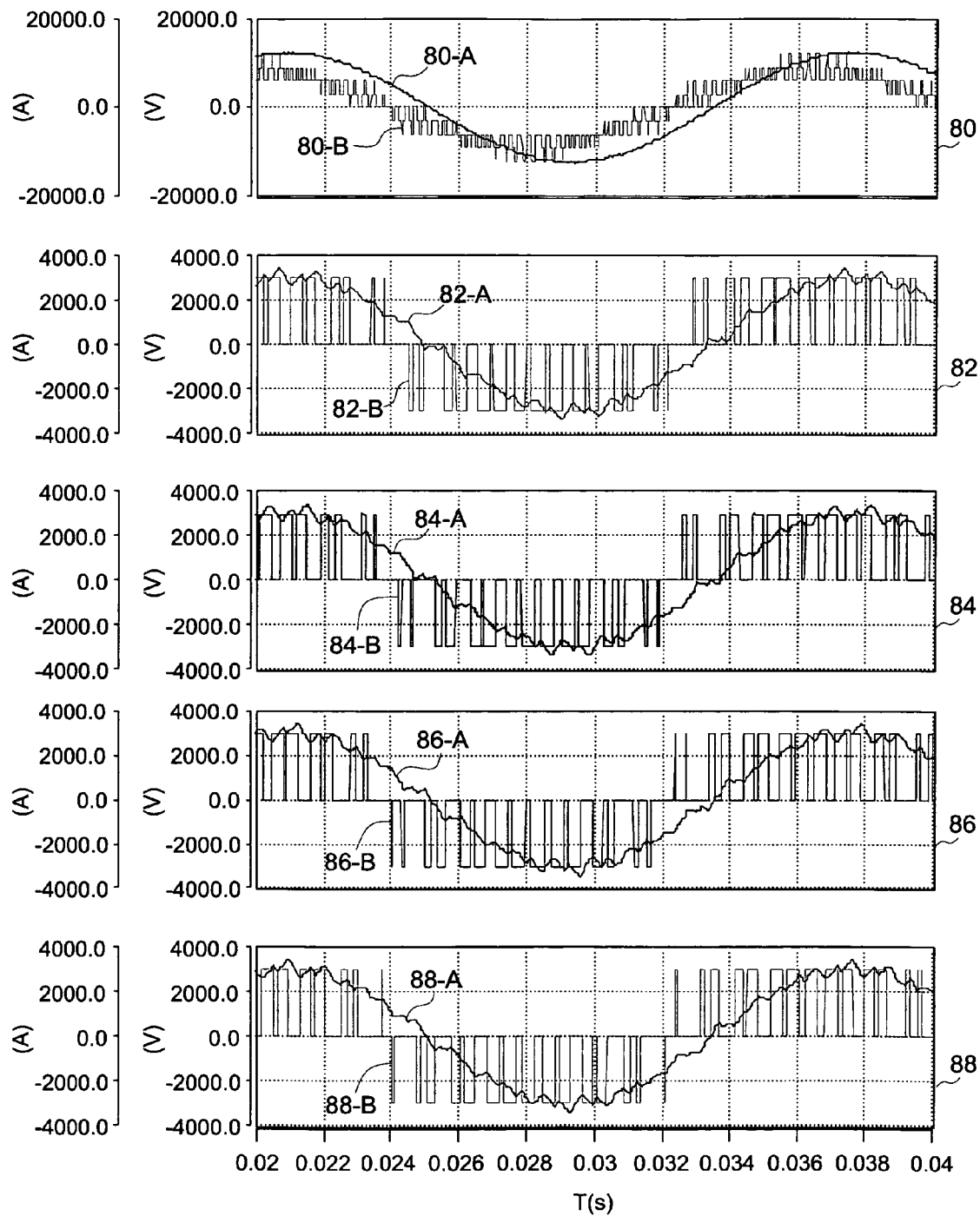
FIG. 5 is a graph illustrating currents and pulse width modulated voltages of the power converter system and each converter thread.

FIG. 5 is a graph illustrating exemplary output current and PWM voltage signals of the power converter system and the individual converter threads. The power converter system, in this example, comprises four converters 20-1 through 20-4 respectively. Graph 80 includes the output current 80-A and PWM voltage 80-B of power converter system 20. Graphs, 82, 84, 86 and 88 include the output current 82-A, 84-A, 86-A and 88-A and PWM voltages 82-B, 84-B, 86-B and 88-B of converters 20-1 through 20-4 respectively. As is clearly seen in FIG. 5, the output signals illustrated in graph 80 are the sum of the output signals of graphs of 82, 84, 86 and 88.

Figure 6:
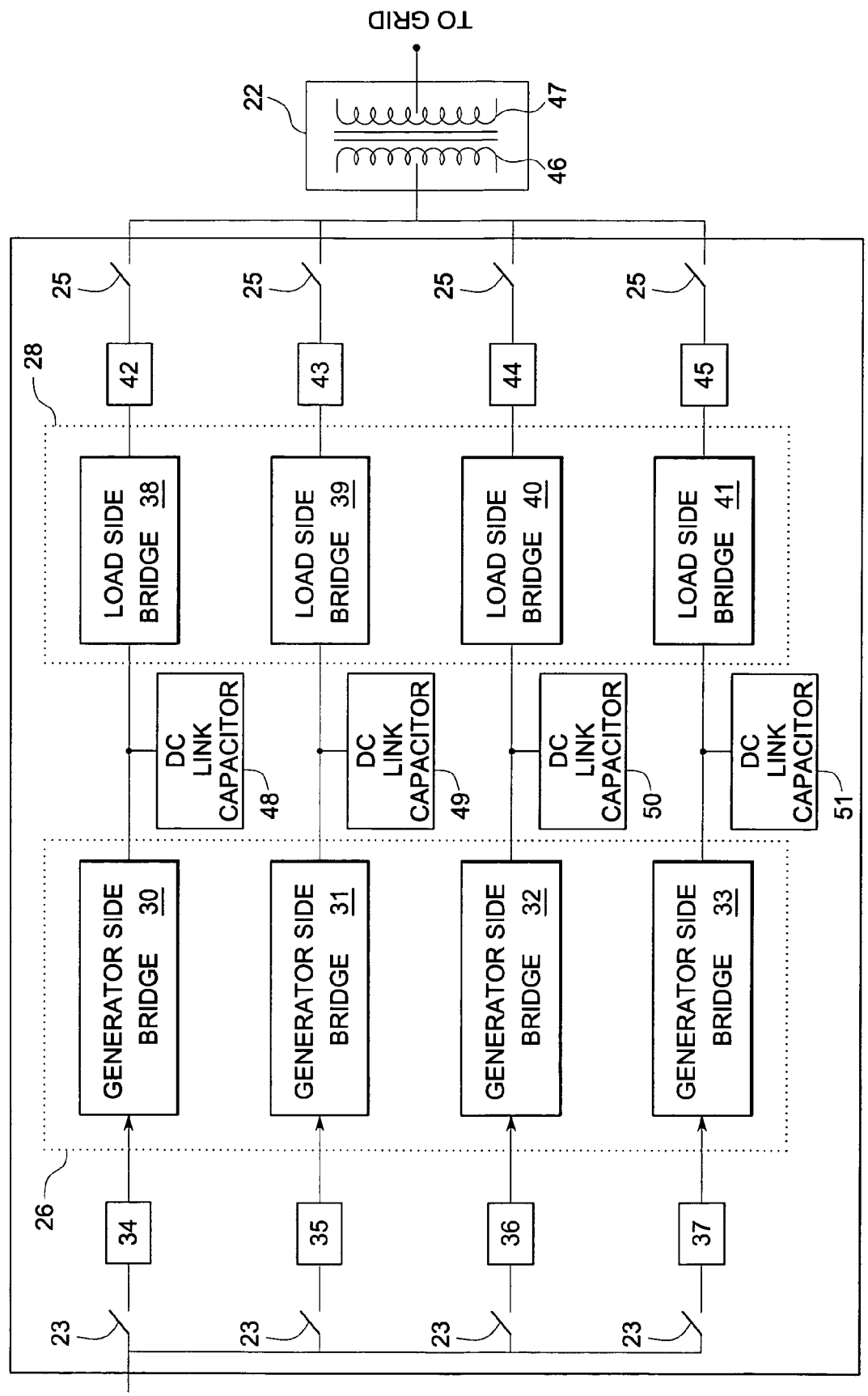
FIG. 6 is a block diagram of a power converter system in accordance with another aspect of the invention.

FIG. 6 is a block diagram illustrating a power converter system in accordance with one aspect of the invention wherein the DC links 48-51 are separated (or "isolated") and wherein a common grid transformer 22 is used. The power converter system includes a generator side converter system 26 and load side converter system 28. The power converter system is described in further detail below.

Generator side converter system 26 includes generator bridges 30-33 coupled in parallel by respective generator side waveform combiners 34-37. Each generator bridge receives input power from generator 14. The generator side converter system also receives control signals from converter control system 24.

Figure 8:
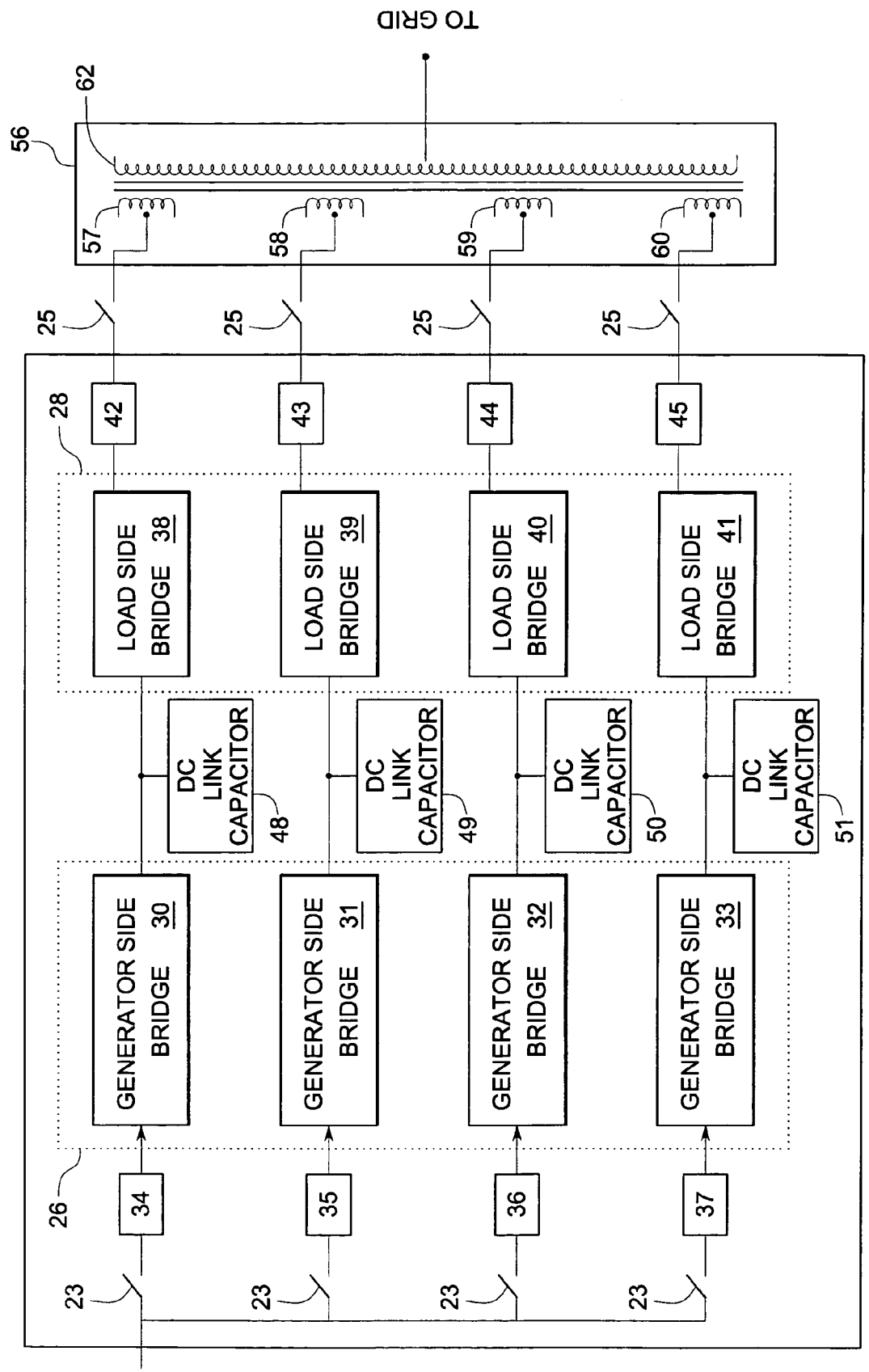
FIG. 8 is a block diagram of an power converter system implemented according to another aspect of the invention.
Figure 9:
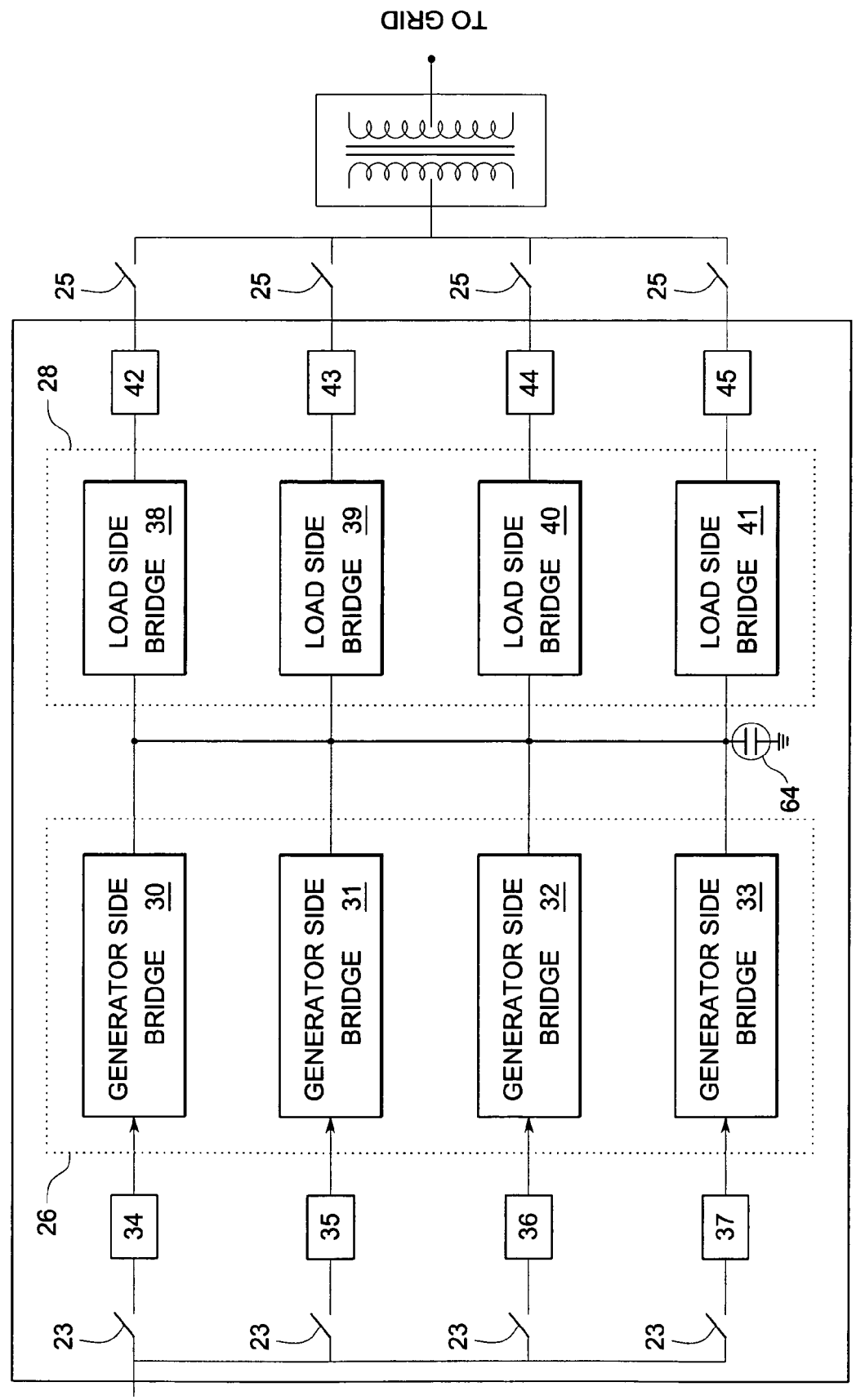
FIG. 9 is a block diagram of an power converter system implemented according to another aspect of the invention.

Load side converter system 28 comprises load side bridges 38-41 coupled on one side to respective generator side converters and on another side to the transformer by respective load side waveform combiners 42-45. Each load side bridge is coupled to the primary winding 46 of transformer 22. The secondary winding 47 of the transformer is coupled to the load. Although four bridges are illustrated on each side for purposes of example in FIGS. 6-9, any number of bridges greater than one can be used. Although separated DC links 48-51 are shown in FIGS. 6-8, another embodiment comprises a common DC link as shown in FIG. 9.

The generator side waveform combiners and the load side waveform combiners (together referred to as waveform combiners) include common mode chokes 74, differential mode chokes 72 or any combination thereof. Example chokes are illustrated in element 42 of FIG. 4 for purposes of illustration. The waveform combiners are used to operate either the generator side converter system or the load side converter system or both in an interleaved fashion.

In one embodiment, the load side converter system operates in an interleaved fashion and includes waveform combiners comprising differential mode chokes 72. Similarly, if the generator side converter system is operated in an interleaved fashion, then the generator side waveform combiners each include a differential mode choke. In a situation where both the generator side converter and the load side converters are operated in the interleaved fashion, the waveform combiners all include differential mode chokes. Common mode chokes 74 are typically included as part of the waveform combiners at either load side converters or generator side converters when load side converters and generator side converters are coupled directly through reactors, e.g. as shown in FIG. 6 and FIG. 9, instead of coupling through multiple windings of transformers.

Figure 7:
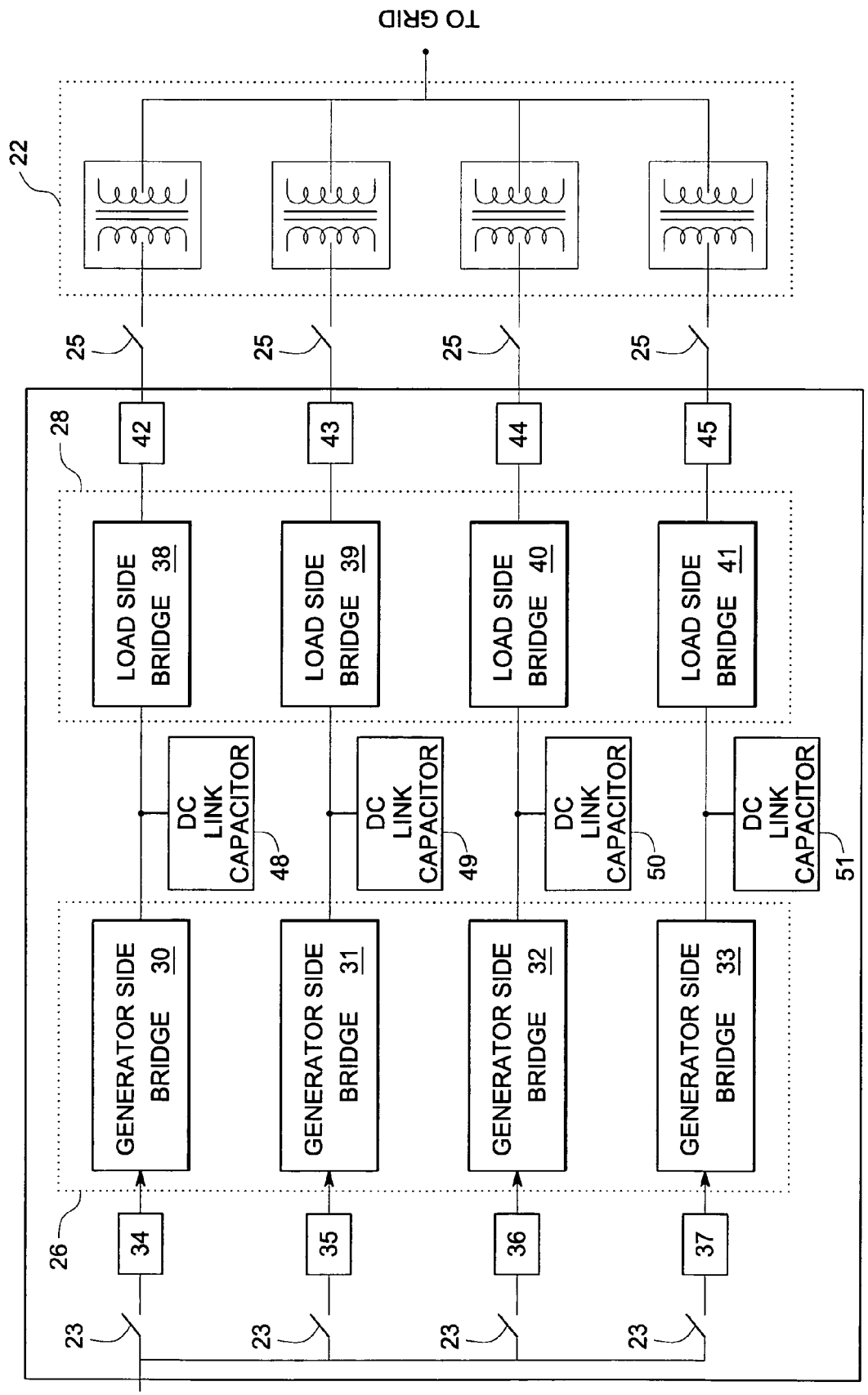
FIG. 7 is a block diagram of an power converter system according to another aspect of the invention.

FIG. 7 is a block diagram illustrating an alternate configuration of an power converter system coupled to multiple transformer units 52, 53, 54 and 55. In the embodiment illustrated in FIG. 7, transformers 52-55 are coupled in shunt. In an alternate embodiment, the transformers may be coupled in series. Each transformer unit 52-55 is connected to corresponding load side bridge 38-41 respectively in parallel through a respective load side waveform combiner 42-45.

As discussed above with respect to FIG. 6, the waveform combiners may be used to operate the load side converter system or the generator side converter system or both in an interleaved fashion. This multiple transformer unit can be readily implemented without any common mode chokes.

FIG. 8 is a block diagram of a third configuration of an power converter system wherein at least one multi-winding transformer 56 is provided. The load side converter system is coupled to the load via multi-winding transformer 56. Transformer 56 includes primary windings 57-60 and one secondary winding 62. The load side bridges 38-41 are each connected to corresponding primary winding 57-60 of the multi-winding transformer 56. The secondary winding is directly coupled to the grid. As discussed above with respect to FIG. 6, the load side waveform combiners and the generator side waveform combiners are used to operate the load side converter system or the generator side converter system or both in an interleaved fashion. This embodiment can also be readily implemented without any common mode chokes.

FIG. 9 is a block diagram illustrating a fourth configuration of the power converter system wherein a common DC link 64 is provided. In the embodiment of FIG. 9, the outputs of the load side bridges are provided to the load via a single transformer 22. In an alternate embodiment, the output of each load side bridge is provided to the load through corresponding individual transformers. The secondary windings of the individual transformers may be coupled in series or in parallel. As discussed above, the load side waveform combiners and the generator side waveform combiners are used to operate the load side converter system or the generator side converter system or both in an interleaved fashion.

In the above described embodiments, the waveform combiners are used to combine the phase displaced switching waveforms from the generator side converter systems and the load side converter systems. Sufficient harmonic reduction is provided so that lower converter switching frequencies are needed to provide high power quality.

Figure 10:
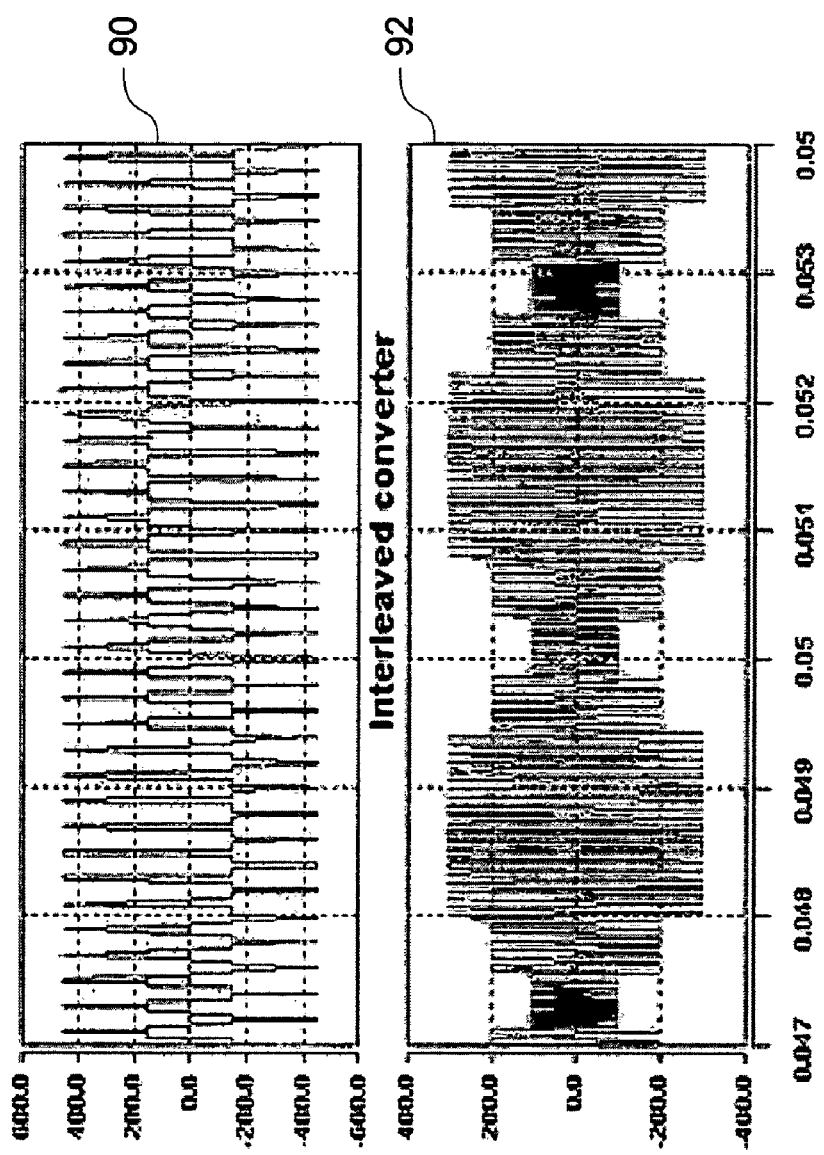
FIG. 10 is a graph comparing exemplary common mode voltages between a regular converter system and an power converter system.

FIG. 10 is a graph illustrating a comparison between exemplary common mode voltage of a regular converter and a power converter system operated in an interleaved fashion. For simplicity, the system is referred to as interleaved power converter system. The common mode voltage of the regular converter is illustrated in plot 90. The common mode of the interleaved power converter system is illustrated by plot 92. It may be appreciated that of the interleaved power converter system is of higher frequency and has lower steps compared to that of the regular converter. This helps to prolong the generator life time by alleviating bearing heating due to induced bearing current from the common mode voltage, and reducing electromagnetic interference (EMI) issue with smaller common mode filters.

The embodiments described in FIGS. 6-9 may be further configured to operate with fault redundant operation capability. For example, faulty bridges can be isolated from the remaining bridges. The interleaved gating pattern can be adjusted such that the remaining bridges can still produce an output of high power quality.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power system for providing an output power to a load, the system comprising;
    a generator configured to generate an alternating current input power;
    a power converter system coupled to the generator and configured to generate an output power and provide the output power to the load; and
    a converter control system coupled to the converter system and configured to drive the converter system in an interleaved pattern so as to control each converter thread with phase displaced gating signals and to reduce harmonic components in the output power or the alternating current input power,
    wherein the power converter system comprises at least one differential mode choke configured to suppress high frequency differential mode cross current resulting from the phase-displaced gating.

2. The power system of claim 1, wherein the power converter system further comprises:
    a generator side converter system comprising a plurality of generator side converters; generator side waveform combiners configured to couple the generator side converters to the generator;
    a load side converter system comprising a plurality of load side converters, each coupled to a respective generator side converter;
    load side waveform combiners configured to couple the load side converters to the load;
    wherein the converter control system is configured to drive the generator side converter system and the load side converter system.

3. The power system of claim 2 wherein at least one of the generator side waveform combiners or at least one of the load side waveform combiners is configured to enable interleaved gating.

4. The power system of claim 2, wherein the generator side waveform combiners and the load side waveform combiners each comprise a differential mode choke configured to enable interleaved operation, a common mode choke, or combinations thereof.

5. The power system of claim 4, wherein a PWM filter is coupled to each load side bridge, wherein the load side waveform combiners each comprise a differential mode choke, and wherein the differential mode chokes each function as at least a portion of the total inductance of the PWM filter.

6. The power system of claim 2, wherein the converter control system is configured to drive the generator side waveform converter system in an interleaved pattern.

7. The power system of claim 2, wherein the converter control system is configured to drive the load side waveform converter system in an interleaved pattern.

8. The power system of claim 2, wherein the power converter system is coupled to the load via at least one transformer and wherein the at least one transformer comprises a common transformer, and wherein the load side converters are each configured for being coupled to the common transformer.

9. The power system of claim 8 , wherein the at least one transformer comprises a plurality of transformers with each of the transformers coupled to a respective load side converter.

10. The power system of claim 2, wherein the generator side converter systems and load side converter systems are coupled by separated DC links.

11. The power system of claim 9, wherein the at least one transformer comprises a plurality of primary windings and a secondary winding, wherein each primary winding is coupled to a respective load side converter and the secondary winding is coupled to the load.

12. The power system of claim 2, wherein generator side converter systems and load side converter systems are coupled by a common DC link.

13. The power system of claim 2, wherein the converter control system is further configured to isolate a faulty power converter.

14. The power system of claim 1, wherein the power converter system is operably coupled to a wind turbine.

15. The power system of claim 1, wherein the power converter system is a three-phase power converter system.

16. A method for providing an output power to a load, the method comprising;
generating an alternating current input power;
converting the alternating current input power to a output power using a converter system,
wherein the output power is provided to the load; and
driving the converter system in an interleaved pattern so as to control each converter thread with phase displaced gating signals and to reduce harmonic components in the output power or the alternating current input powers,
wherein power converter system comprises at least one differential mode choke configured to suppress high frequency differential mode cross current resulting from the phase-displaced gating.

17. The method of claim 16, wherein the converting comprises:
converting the alternating current input power to dc power using a generator side converter system comprising a plurality of generator side converters each coupled to the generator using a respective generator side waveform combiner;
converting the dc power to the output power using a load side converter system comprising a plurality of load side converters each coupled to the load using a respective load side waveform combiner.

18. The method of claim 16, wherein the generator side and load side waveform combiners each comprise a differential mode choke configured to enable interleaved operation, a common mode choke, or combinations thereof.

19. The method of claim 16, comprising driving the generator side converter system in an interleaved pattern.

20. The method of claim 16, comprising driving the load side converter system in an interleaved pattern.

21. The method of claim 16, comprising driving the generator side converter system and the load side converter system in an interleaved pattern.

22. The method of claim 16, further comprising isolating a faulty power converter and maintaining the output power.

23. A power system for providing an output power to a load, the system comprising;
a wind turbine configured to generate a variable frequency input power;
an power converter system coupled to the wind turbine and configured to generate an output power and provide the output power to the load; and
a converter control system coupled to the converter system and configured to drive the converter system in an interleaved pattern so as to control each converter thread with phase displaced gating signals and to reduce harmonic components in the output power or the variable frequency input power,
wherein the power converter system comprises at least one differential mode choke configured to suppress high frequency differential mode cross current resulting from the phase-displaced gating.

24. The power system of claim 23, wherein the power converter system further comprises:
a generator side converter system comprising a plurality of generator side converters;
generator side waveform combiners configured to couple the generator side converters to the generator;
a load side converter system comprising a plurality of load side converters, each coupled to a respective generator side converter;
load side waveform combiners configured to couple the load side converters to the load;
wherein the converter control system is configured to drive the generator side converter system and the load side converter system.

25. The power system of claim 24 wherein at least one of the generator side waveform combiners or at least one of the load side waveform combiners is configured to enable interleaved gating.

26. The power system of claim 24, wherein the generator side waveform combiners and the load side waveform combiners each comprise a differential mode choke configured to enable interleaved operation, a common mode choke, or combinations thereof.

27. The power system of claim 24, wherein the generator side waveform combiners each comprise a generator side differential mode choke configured to enable interleaved operation.

28. The power system of claim 24, wherein the load side waveform combiners each comprise a load side differential mode choke configured to enable interleaved operation.

29. The power system of claim 28, wherein a PWM filter is coupled to each load side bridge, and wherein the differential mode chokes each function as at least a portion of the total inductance of the PWM filter.

30. The power system of claim 23, wherein the output power comprises PWM voltage.

31. The method of claim 16, wherein the output power comprises PWM voltage.

32. The power system of claim 1, wherein the power converter comprise a plurality of power converters, wherein the plurality of converters are coupled in parallel.

33. The power system of claim 32, wherein the output power comprises PWM voltage.

* * * * *